US010732421B2

(12) United States Patent
Robinson (10) Patent No.: US 10,732,421 B2
(45) Date of Patent: Aug. 4, 2020

(54) BUS DUCT WITH A CURVED VIEWING WINDOW ASSEMBLY

(71) Applicant: Martin Robinson, Bradenton, FL (US)

(72) Inventor: Martin Robinson, Bradenton, FL (US)

(73) Assignee: IRISS HOLDINGS, INC., Bradenton, FL (US)

( * ) Notice: Subject to any disclaimer, the term of this patent is extended or adjusted under 35 U.S.C. 154(b) by 591 days.

(21) Appl. No.: 14/074,897

(22) Filed: Nov. 8, 2013

(65) Prior Publication Data

US 2015/0131177 A1    May 14, 2015

(51) Int. Cl.
*G02B 27/02* (2006.01)
*G02B 3/00* (2006.01)

(52) U.S. Cl.
CPC ......... *G02B 27/022* (2013.01); *G02B 3/0037* (2013.01)

(58) Field of Classification Search
CPC ........ G02B 27/02; G02B 7/007; G02B 7/006; G02B 5/208; G02B 5/5223; G02B 5/08; G02B 23/16; G02B 13/143; G02B 27/022; G02B 3/0037; B60R 1/002; B60R 1/082; B60R 1/12; B60R 1/0602; E06B 9/01; E06B 3/685
USPC ....... 359/894, 808, 819, 885, 863, 864, 879, 359/883, 892, 507, 511, 350, 355; 52/456, 507, 664
See application file for complete search history.

(56) References Cited

U.S. PATENT DOCUMENTS

| 2,659,686 | A | * | 11/1953 | Watkins | .......................... 52/208 |
| 2,944,101 | A | * | 7/1960 | Albright | ............... H02G 5/061 |
| | | | | | 174/99 B |
| 6,576,912 | B2 | * | 6/2003 | Visser | ................... B82Y 10/00 |
| | | | | | 250/492.2 |
| 8,164,827 | B2 | | 4/2012 | Robinson | |
| 8,400,708 | B2 | | 3/2013 | Robinson | |
| 2010/0014152 | A1 | * | 1/2010 | Robinson | ...................... 359/350 |

FOREIGN PATENT DOCUMENTS

JP    11153488    6/1999

* cited by examiner

*Primary Examiner* — Jie Lei
(74) *Attorney, Agent, or Firm* — Renner Kenner Greive Bobak Taylor & West

(57) ABSTRACT

A curved viewing window assembly for an electrical assembly having a non-flat curved surface such as an isophase bus duct or electrical motor housing, includes a curved lens assembly having a lens section disposed between a curved front grille and a curved rear grille and is transparent to infrared (IR), ultraviolet (UV), or visible light. The curved lens assembly is attached to an aperture disposed through a curved wall of the bus duct at a point proximate to the location in which electrical equipment within the bus duct is to be monitored. Disposed through each at the front and rear grilles is a plurality of viewing apertures permitting the IR, UV, or visible light from the electrical equipment or components to pass therethrough. A curved door is pivotably attached to the front grille to allow selective access to the curved infrared viewing window.

17 Claims, 7 Drawing Sheets

BUS DUCT WITH A CURVED VIEWING WINDOW ASSEMBLY

TECHNICAL FIELD

Generally, the present invention relates to a viewing window assembly used to monitor electrical equipment and components mounted in a housing. In particular, the present invention relates to a curved viewing window assembly for an electrical assembly or conductor that has a non-flat curved surface such as an isophase bus duct or electrical motor housing, that permits the transmission of infrared (IR) light, ultraviolet (UV) light, and/or visible light therethrough. More particularly, the present invention relates to a curved viewing window assembly for a bus duct that includes a curved door that permits selective access to a curved lens assembly the permits the transmission of infrared (IR) light, ultraviolet (UV) light, and/or visible light therethrough.

BACKGROUND OF THE INVENTION

Electrical equipment and components are often mounted within various housings to protect them from potentially damaging environmental effects, such as the weather, and to protect individuals that come in close proximity to such electrical equipment from injury in the event of the catastrophic failure of such electrical equipment. Moreover, it is also typically required for such electrical equipment and components to be inspected periodically to ensure that their operational performance is within target specifications and defined operating parameters. Therefore, access to the electrical equipment and components within the housing to examine and analyze such equipment and components is necessary, while still providing the safety benefits to both the equipment and the individuals inspecting the equipment.

One approach for accomplishing such inspections of the electrical equipment and components mounted within the protective housing is to utilize various cameras or sensors that are sensitive to different spectral ranges of electromagnetic radiation or light. For example, a camera or detector sensitive to either infrared (IR) light, ultraviolet (UV) light, or visible light may be used to image the electrical equipment and components, in order to ensure that the electrical equipment and components are operating within their intended operating specifications. That is, by obtaining an image (thermal, ultraviolet, or visual) of the electrical equipment using such cameras, an inspector is able to identify specific areas of the electrical equipment or components that are failing or that are achieving temperatures that are hotter or cooler than their specified operating range. Such a monitoring process allows the inspector of such electrical equipment and components to readily identify and resolve any potential problems before they occur, as well as to troubleshoot any existing problems.

In order to provide access to the electrical equipment or components carried within the housing, a viewing window is disposed within the wall of the housing, which is transparent to either IR, UV, or visible light, so as to allow the corresponding camera to have a clear field of view (FOV) of the electrical equipment and components there within. In other words, in the case of an IR viewing window, it is formed of infrared (IR) transparent material; in the case of an ultraviolet (UV) viewing window, it is formed of ultraviolet (UV) transparent material; and in the case of a visible light viewing window, it is formed of material that is transparent to visible light and readily viewed by a human observer. As such, the selected IR, UV, or visible light viewing window allows the transmission of the corresponding electromagnetic spectral range to pass therethrough so that it can be imaged or otherwise monitored by the appropriate camera or detection device.

It is a typical practice in industry to retrofit existing housings with viewing windows. However, such a process requires specialized training, and a substantial amount of time to precisely identify the optimal location for placing the viewing window in the housing to maximize the viewing angle or field of view (FOV) of the camera or detector through the viewing window to obtain images of the most critical aspects of the electrical equipment and components that are carried therein. As such, due to the complexities involved, retrofitting the viewing window to an existing housing often leads to less than optimal results.

For example, typical bus ducts, such as iso-phase bus ducts, due to their cylindrical shape, are difficult to inspect, and require substantial modification in order to be retrofit with standard flat or planar infrared (IR) viewing windows. As such, this additional complication that cylindrical bus ducts and other curved housings cause during the retrofit process, increases the likelihood that an unsatisfactory result will be achieved when retrofitting a curved housing with a flat or planar IR viewing window. In one aspect, such unsatisfactory results may include unwanted environmental leakage around the interface of the bus duct and the IR viewing window, as well as unwanted intrusion of debris and other particles from the external environment through the interface into the housing.

Therefore, there is a need for a curved viewing window assembly for a curved housing, such as a cylindrical bus duct, that includes a curved lens assembly that is made integral with or retro fit to the curved housing to monitor electrical equipment and components mounted therein. Still yet, there is a need for a curved viewing window assembly for a curved housing, that includes a curved lens assembly that is transparent to infrared (IR), ultraviolet (UV), and/or visible light to monitor electric equipment and components mounted therein. In addition, there is a need for a curved viewing window assembly for a housing having an at least partially curved portion, such as a cylindrical bus duct, that has a curved door that can be opened and closed, so as to provide selective access to the curved lens assembly.

SUMMARY OF THE INVENTION

In light of the foregoing, it is a first aspect of the present invention to provide an infrared window assembly comprising a body having an at least partially curved portion with an aperture disposed therethrough, the body defining a cavity that is configured to carry one or more components therein; and a lens assembly disposed upon the at least partially curved portion of the body, the lens assembly including a curved lens transparent to at least one of infrared (IR) light, ultraviolet (UV) light, or visible light and at least one curved grille for supporting the curved lens, the at least one curved grille having a plurality of viewing apertures, the curved lens and the plurality of viewing apertures of the at least one curved grille in optical alignment with the first aperture.

It is a further aspect of the present invention to provide a device for a curved surface having an aperture disposed therethrough, the device comprising a lens assembly adapted to be disposed upon the curved surface, the lens assembly including a curved lens transparent to at least one of infrared (IR) light, ultraviolet (UV) light, or visible light, and at least one curved grille for supporting the curved lens, the at least one curved grille having a first group of a plurality of viewing apertures, the curved lens having a first group of a plurality of viewing apertures in optical alignment with the first aperture.

It is yet another aspect of the present invention to provide a viewing window assembly for a curved surface having an aperture disposed therethrough, the viewing window assembly comprising a curved first grille having a first group of a plurality of viewing apertures disposed therethrough; a curved second grille having a second group of a plurality of viewing apertures disposed therethrough; and a lens section disposed between the first and second grilles, the lens section in optical alignment with each the first and second groups of the plurality of viewing apertures, wherein the second grille is attached to the first grille, the first grille adapted to be attached to the curved surface, such that the first and second viewing apertures are substantially aligned with an aperture disposed through the curved surface.

BRIEF DESCRIPTION OF THE DRAWINGS

These and other features and advantages of the present invention will become better understood with regard to the following description, appended claims, and accompanying drawings wherein:

DETAILED DESCRIPTION OF THE INVENTION

Figure 1:
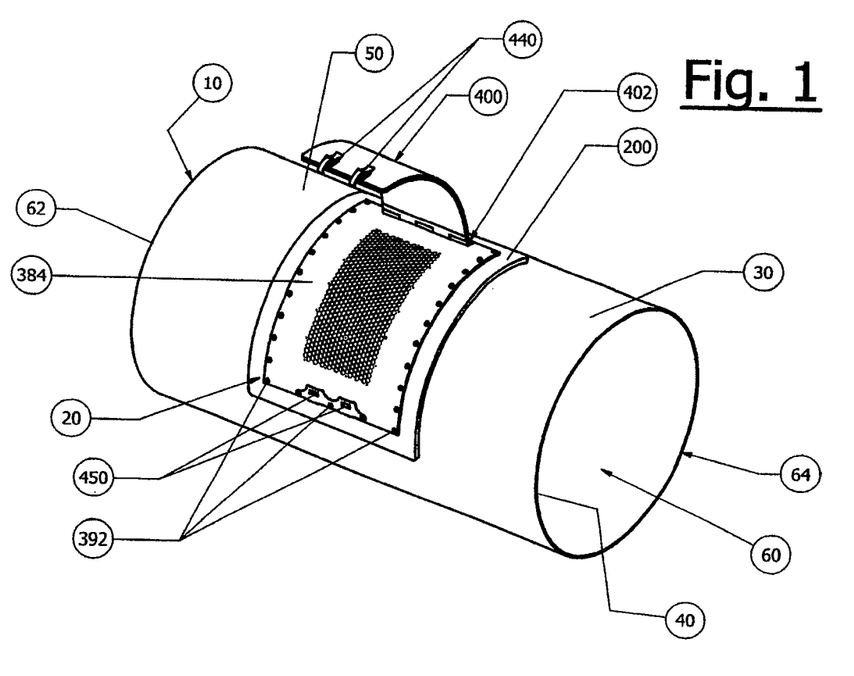
FIG. 1 is a perspective view of a curved bus duct having a curved viewing window assembly mounted thereto in accordance with the concepts of the present invention.

A viewing window assembly for a curved bus duct 10 is generally referred to by the numeral 20, as shown in FIG. 1 of the drawings. The bus duct 10, such as an isolated-phase bus duct, generally comprises an elongated cylindrical duct or conduit having a curved wall 30 that is formed of any suitable electrically conductive material, such as steel or aluminum for example. It should be appreciated, however, that while the bus duct 10 is discussed herein as a housing for use with the curved viewing window assembly 20, any housing having any suitable shape, such as a rectilinear shape, a curvilinear shape, or a combination of both, may be used in conjunction with the curved viewing window assembly 20, as long as a portion of the housing to which the viewing window assembly 20 is attached is curved.

Continuing, the wall 30 of the bus duct 10 has an inner and outer surface 40 and 50, such that the inner surface 40 defines a cavity 60 bounded by open ends 62 and 64 that is configured to carry therein any desired electronic components or equipment. However, it should also be appreciated that in alternative embodiments, the ends 62 and 64 of the cavity 60 may be closed or at least partially closed, so that the bus duct 10 effectively becomes an enclosed housing. The bus duct 10 is configured to carry therein any desired electrical components or equipment therein that is desired to be monitored via the viewing window assembly 20 in a manner to be discussed. For example, the electrical equipment mounted in the bus duct 10 may include an electrically conductive medium, such as an electrically conductive wire or bus bar (not shown) that is suspended within the cavity 30 of the bus duct 10 by non-conductive or dielectric supports (not shown), formed of porcelain or polymer for example.

Figure 2:
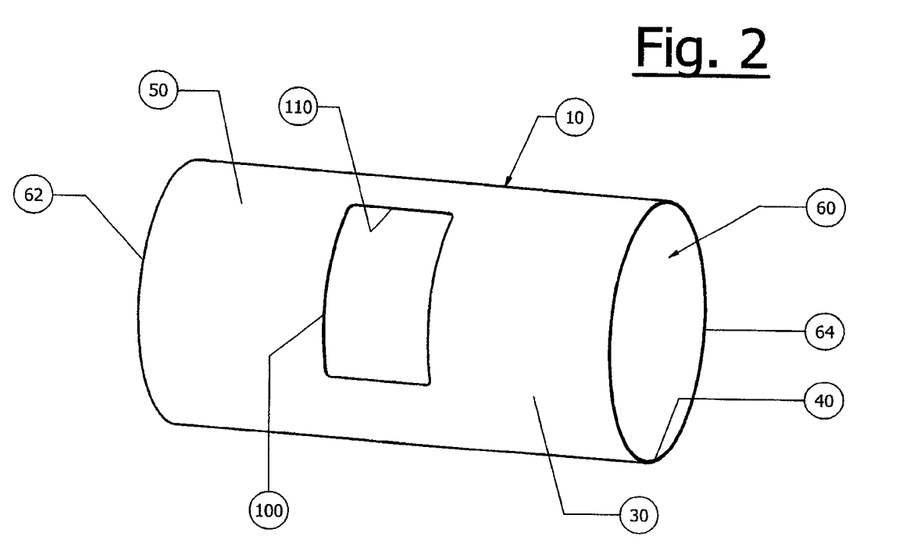
FIG. 2 is an elevational view of the bus duct without the curved viewing window assembly attached in accordance with the concepts of the present invention.

To mount the curved viewing window assembly 20 to the bus duct 10, a primary aperture 100 is disposed through the wall 30 of the bus duct 10, which is bounded by an edge 110, as shown in FIG. 2. In one aspect, the primary aperture 100 may be substantially rectangular, as shown in FIG. 2, although it may take on any desired shape, including a rectilinear shape, a curvilinear shape, or a shape that is a combination of both.

Figure 3:
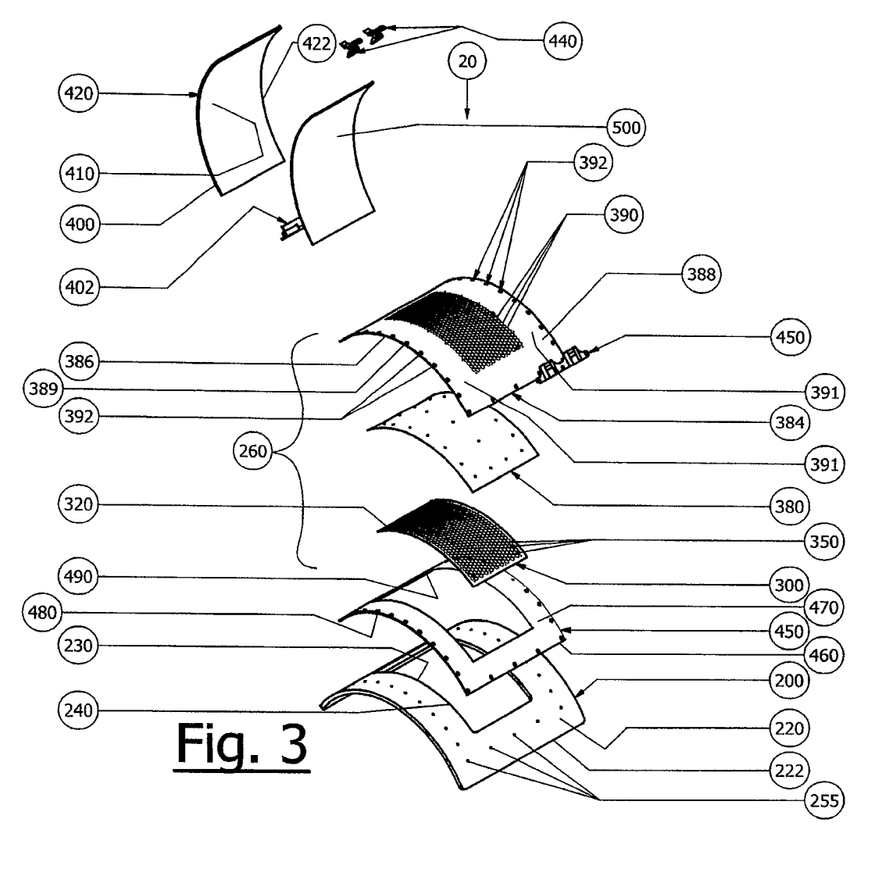
FIG. 3 is an exploded view of the curved viewing window assembly in accordance with the concepts of the present invention.
Figure 4:
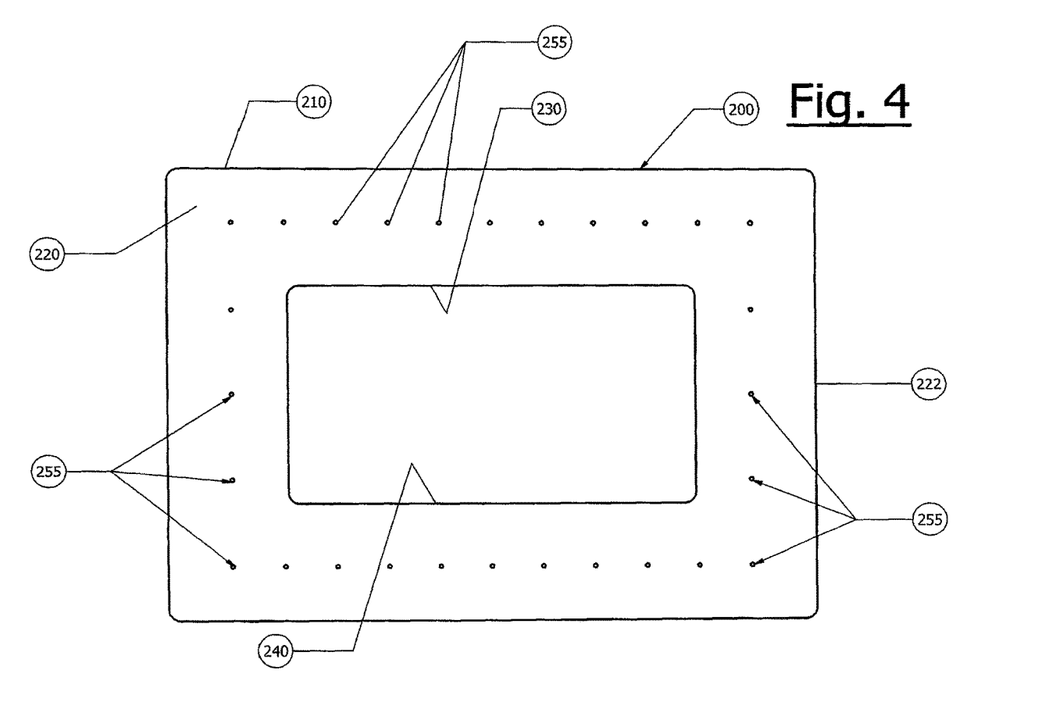
FIG. 4 is a top plan view of a support plate of the curved viewing window assembly in accordance with the concepts of the present invention.

The curved viewing window assembly 20 includes a support plate 200, as shown clearly in FIGS. 3 and 4, that is comprised of any suitable material, such as steel or aluminum for example, that is capable of being attached to the outer surface 50 of the wall 30 of the bus duct 10 using any suitable means, such as welding for example. The support plate 200 includes an inner surface 210 and an outer surface 220 that is bounded by an outer edge 222. A secondary aperture 230 is disposed through the support plate 200, which is defined by an edge 240. The secondary aperture 230 is formed to have a substantially rectangular shape that corresponds substantially to the shape of the primary aperture 100 of the bus duct 10; however, the secondary aperture 230 may be configured to take on any desired shape, such as a curvilinear shape, a rectilinear shape, or a shape that is the combination of both for example. That is, the shape of the primary and secondary apertures 100, 230 are generally chosen so that they are substantially equivalent shapes; however, such relationship is not required. Furthermore, the support plate 200 is configured such that the inner surface 210 is contoured or shaped to substantially correspond to the shape or contour of the outer surface 50 of the wall 30 of the bus duct 10. That is, the support plate 200 may be configured so that the inner surface 210 of the support plate 200 has a radius of curvature that is substantially similar to the radius of curvature of the outer surface 50 of the wall 30 of the bus duct 10. This allows the support plate 200 to be mounted substantially congruent to the outer surface 50 of the wall 30 of the bus duct 10 when mounted thereto. As such, the support plate 200 is attached to the outer surface 50 of the wall 30 of the bus duct 10, such that the edge 240 of the secondary aperture 230 of the support plate 200 is substantially aligned with the edge 110 of the primary aperture 100 of the bus duct 10. However, such alignment is not required, so long as at least a portion of the primary aperture 100 of the bus duct 10 and at least portion of the secondary aperture 230 of the support plate 200 of the curved viewing window assembly 20 overlap to allow the transmission of IR radiation, UV radiation, or visible light from electrical equipment and components mounted in the bus duct 10 to pass through. In addition, the support plate 200 also includes a plurality of mounting apertures 255 that circumscribe the periphery of the edge 240.

The curved viewing window assembly 20 also includes a curved lens assembly 260, as shown in FIG. 3, which is attached to the support plate 200. The curved lens assembly 260 is configured to enable the transmission of any combination of infrared (IR) light, ultraviolet (UV) light and/or visible light therethrough depending on its configuration. That is, the lens assembly 260 may be configured to transmit IR, UV, or visible light in any desired combination. It should be appreciated that the lens assembly 260 may also be configured to allow the transmission of any desired electromagnetic spectral range or portion thereof to facilitate the monitoring of electronic equipment carried in the bus duct 10. In addition to controlling which portion of the electromagnetic spectrum is permitted to pass therethrough, the lens assembly 20 also provides a suitable support to ensure the structural integrity of the lens assembly 260 as a whole. Such a design serves to prevent injury to those individuals that are required to access the viewing window assembly 10 to monitor the electrical equipment or components mounted within the bus duct 10 in the event of a catastrophic failure of electrical equipment or components.

Figure 5:
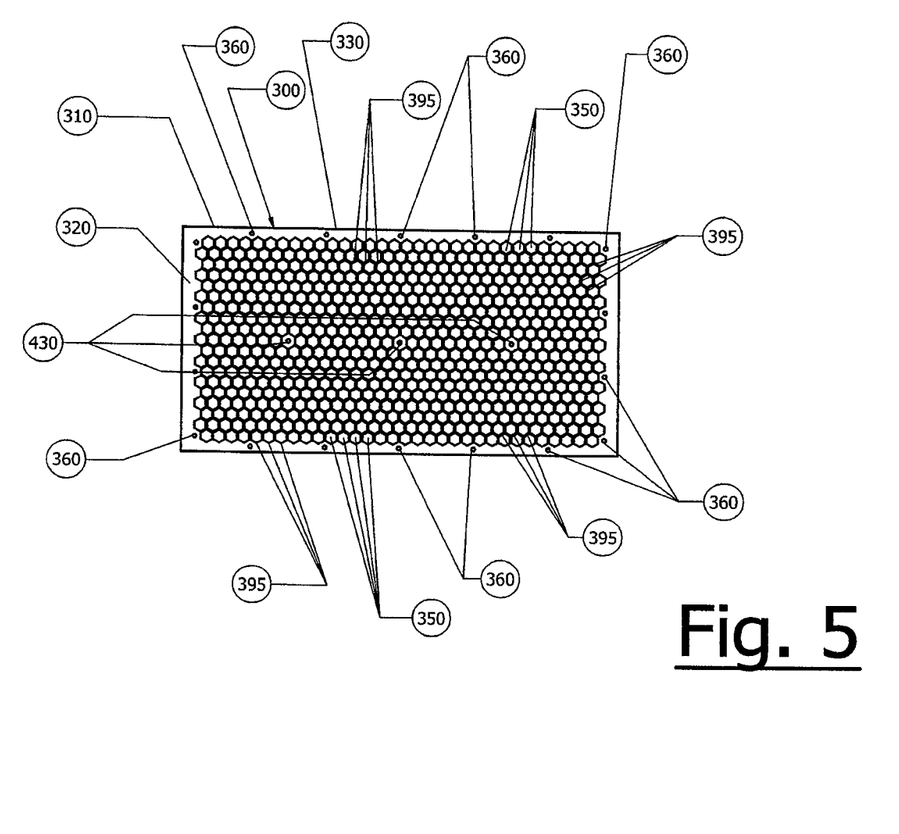
FIG. 5 is a top plan view of a rear grille of the curved viewing window assembly in accordance with the concepts of the present invention.

Specifically, the lens assembly 260 includes a curved rear grille 300 that includes an inner surface 310 and an outer surface 320 that is bounded by an edge 330, as shown in FIGS. 3 and 5. The rear grille 300 may be formed of any suitable material, such as steel or aluminum for example, and is configured such that a plurality of viewing apertures 350 are disposed therethrough and arranged as a tessellation. In one aspect, the viewing apertures 350 may be any desired shape, such as a hexagonal or honeycomb shape for example, as shown in the Figs. Disposed proximate to the edge 330 of the rear grille 300 are attachment apertures 360, that are configured to receive any suitable fastener therethrough, such as screws or rivets, to enable the attachment of the rear grille 300 to the support plate 200, as shown in FIGS. 1 and 3. In addition, the rear grille 300 is configured, such that the outer surface 320 has a substantially curvilinear shape. However, it should be appreciated that the inner surface 310 may have a substantially curvilinear shape or other suitable shape, such as a rectilinear shape.

The curved lens assembly 260 also includes a lens or lens section 380, which comprises material that is substantially transparent to any combination of infrared (IR) light, ultraviolet (UV) light and/or visible light. However, it should be appreciated that the lens section 380 of the assembly 260 may be configured to be substantially transparent to any desired portion of the electromagnetic spectrum. In one aspect, the lens section 380 may be formed of any suitable material, such as polymeric or crystalline material for example, that is capable for taking on any curved shape or that is preformed into any curved shape. In another aspect, the lens section 380 may comprise polymeric material that is opaque or transparent to visible light, but that is transparent to infrared (IR) or ultraviolet (UV) light. The lens section 380 is positioned so as to be disposed upon the outer surface 320 of the rear viewing window 300. In one aspect, the lens section 380 may be sufficiently flexible to take on the curvature of the other components of the viewing window assembly 20 when assembled, or may be preformed as a solid piece with a desired curvature. Moreover, in the case of a rigid, pre-formed piece, the lens section 380 may be configured to have a radius of curvature that substantially corresponds to or matches the radius of curvature of the outer surface 320 of the rear grille 300, allowing it to lay congruently thereon.

Figure 6:
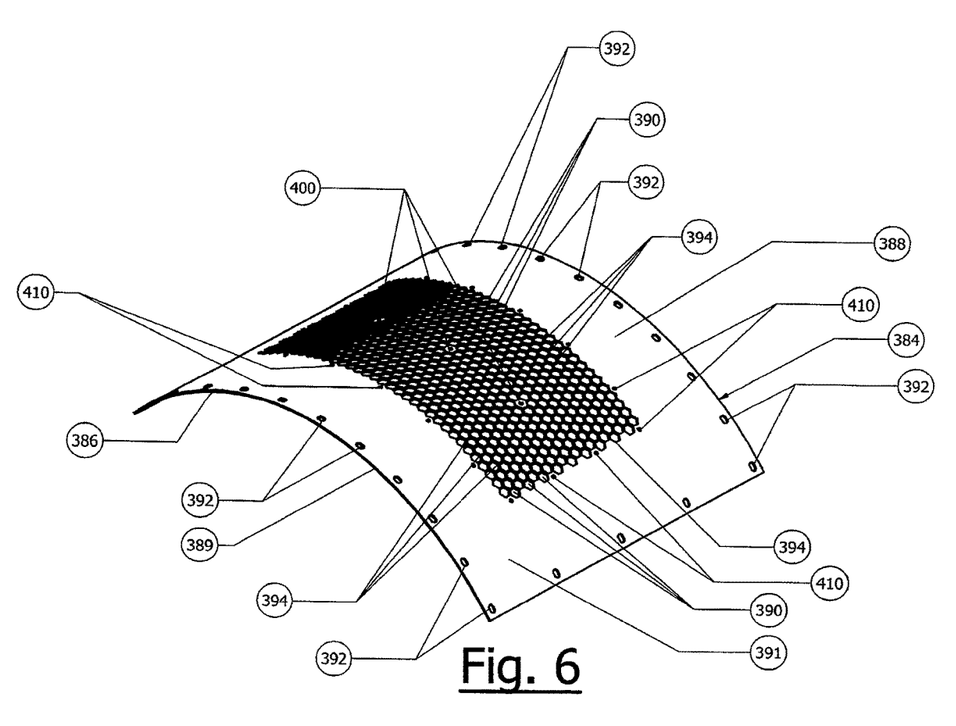
FIG. 6 is a perspective view of the front grille of the curved viewing window assembly in accordance with the concepts of the present invention.

Disposed over the lens section 380 is a curved front grille 384, as shown in FIGS. 3 and 6. The front grille 384 includes an inner surface 386 and an outer surface 388 that is bounded by an edge 389. The front grille 384 may be formed of any suitable material, such as steel or aluminum for example, and is configured such that a group of a plurality of viewing apertures 390 are disposed therethrough and are arranged as a tessellation. In one aspect, the viewing apertures 390 may be any desired shape, such as a hexagonal or honeycomb shape for example. In addition, the group of viewing apertures 390 is spaced from the edge 389 of the front grille 384 by any suitable distance so that an offset section 391 circumscribes the group of viewing apertures 390, and separates them from the edge 389 of the front grille 384, as shown in FIG. 6. Disposed proximate to the edge 389 of the front grille 384 are attachment apertures 392 that are configured to receive any suitable fastener, such as screws or rivets, therethrough to enable the attachment of the front grille 384 to the support plate 200, as shown in FIG. 1. Furthermore, the radius of curvature of the inner surface 386 of the front grille 384 is chosen so that the inner surface 386 can lay congruently upon the curved surface of the lens section 380. It should be appreciated that the viewing apertures 390 and 350 of the rear and front grilles 300 and 384 are defined by respective frame edges or sections 394 and 395. As such, the thickness of the frame edges or sections 394, 395 determine the spacing between the viewing apertures 350,390.

Thus, to form the lens assembly 260, the front grille 384 is joined or attached with the rear grille 300, so that the lens section 380 is captured there between, as shown in FIG. 3. Specifically, the front grille 384 includes a plurality of central attachment apertures 400 that are positioned among the viewing apertures 390, as well as a plurality of periphery apertures 410 that are disposed about the periphery of the viewing apertures 390. In addition, the rear grille 300 includes periphery apertures 360 and central attachment apertures 430 that are centrally disposed through the rear grille 300 among the viewing apertures 350. Furthermore, because the radius of curvature of the inner surface 386 of the front grille 384 complements the radius of curvature of the outer surface 310 of the rear viewing window 300, the rear grille 300 is able to readily mate with the front grille 384, while retaining the lens section 380 there between. In one aspect, the rear grille 300 may be attached to the front grille 384 using screws or other fasteners that are received through the central attachment apertures and 400, 430, as well as through the periphery apertures 410 and 360 of the front and rear grilles 384, 300.

Once the curved lens assembly 260 has been assembled, a curved gasket 450 is attached to the support plate 200. The gasket 450 includes an inner surface 460 and an outer surface 470 that is bounded by an outer edge 480. Disposed through the gasket 450 is a gasket aperture 490 that is dimensioned to substantially align with the secondary aperture 230 of the support plate 200 when the inner surface 460 of the gasket 450 is attached thereto. The gasket 450 may also include aperture 500 that enable the gasket 450 to be fastened to the support plate 200 using any suitable fastener, such as screws or rivets that are received through apertures 392 of the front grille 384 and the apertures 255 of the support plate 200.

Furthermore, because the offset section 391 of the front grille 384 extends beyond the edges of the lens section 380 and the rear grille 300, the front grille 384 contacts the gasket 450, such that it is sealed to the support plate 200. That is, the lens assembly 260 is sealed against the bus duct 10 at an interface. Furthermore, the rear grille 300 may be sealed to the interface of the support plate 200 using any suitable sealing means, such as a gasket 450, as shown in FIG. 3, as well as adhesive, rubber grommets, or the like.

The gasket 450 may be formed of any suitable material, such as rubber, silicone, or the like, that serves to form a seal that is a barrier to IR radiation, and that is water and/or airtight. As a result of this seal at the interface, the intrusion of unwanted debris or other particles through the interface and into the bus duct 10 is prevented, along with the prevention of the unwanted leakage of IR radiation out of the bus duct 10.

It should also be appreciated that the radius of curvature of the inner surface 386 of the front grille 384 is substantially equivalent to the radius of curvature of the rear grille 300, the radius of curvature of the outer surface 210 of the support plate 200, and the radius of curvature of the IR lens section 380 in the case of a pre-formed IR lens 260. This allows the front grille 384 to be mounted congruently to the support plate 200 when the IR window assembly 20 is mounted to the bus duct 10.

In addition, to maintain a normal line-of-sight through the full viewing angle of the viewing apertures 350 and 390 of the viewing window 20, the radius of curvature of the front grille 384 is dimensioned so that it is larger than the radius of curvature of the rear grille 300, and the thickness of the frame sections 395 (i.e. spacing between the viewing apertures 350 and 390) defining the viewing apertures 390 of the front grille 384 are made thicker than the frame sections 394 that define the viewing apertures 350 of the rear grille 300. As a result of this relationship between the radius of curvature and the thickness of the frames 394,395, the viewing apertures 350 and 390 are provided in an aligned arrangement, so that the passage of the IR, UV, and visible light through the viewing apertures 350 and 390 of the lens assembly 260 is maximized.

That is, to maintain the normal line-of-sight through the full viewing angle of the lens assembly 260, the spacing of the viewing apertures 350 and 390 based on the radius of curvature of the rear grille 300 and the front grille 384 is first identified. That is, the spacing between each of the viewing apertures 390 of the front grille 384, which is defined by the thickness of the frames 395 and the spacing between each of the viewing apertures 350 of the rear grille 380, which is defined by the thickness of the frames 395 changes based on the radius or offset set forth by the following equation:

$$\theta_1 = \frac{S_1}{R_1}, \theta_2 = \frac{S_2}{R_2}.$$

Specifically, $\theta_1$ is the angle between the each of the viewing apertures 350 of the rear grille 300, and $\theta_2$ is the angle between each of the viewing apertures 390 of the front grille 384; $S_1$ is the arc length (i.e. space between the viewing apertures defined by the thickness of the frames 394) between the viewing apertures 350 of the rear grille 300; $S_2$ is the arc length (i.e. space between the viewing apertures defined by the thickness of the frames 395) between viewing apertures 390 of the front grille 384; $R_1$ is the radius of curvature of the rear grille 300; and $R_2$ is the radius of curvature of the front grille 384.

As such, the arc length or spacing between the viewing apertures 350 of the rear grille 300 based on the radius of curvature of the front grille 384 and the arc length or spacing between the viewing apertures 350 of the front grille 384, and is calculated by the equation:

$$S_1 = \left(\left(\frac{S_2}{R_2}\right) * R_1\right).$$

In addition, the arc length or spacing between the viewing apertures 390 of the front grille 384 is based on the radius of curvature of the rear grille 300 and the arc length or spacing between the viewing apertures 350 of the rear grille 300, and is calculated by the equation:

$$S_2 = \left(\left(\frac{S_1}{R_1}\right) * R_2\right).$$

It should also be appreciated that the lens assembly 260 of the present invention may be based on the infrared (IR) window assembly set forth in U.S. Pat. No. 8,164,827, incorporated herein by reference, but modified to achieve the curved shape of the front and rear grilles 384 and 300 and the IR lens section 380 discussed above.

Figure 7:
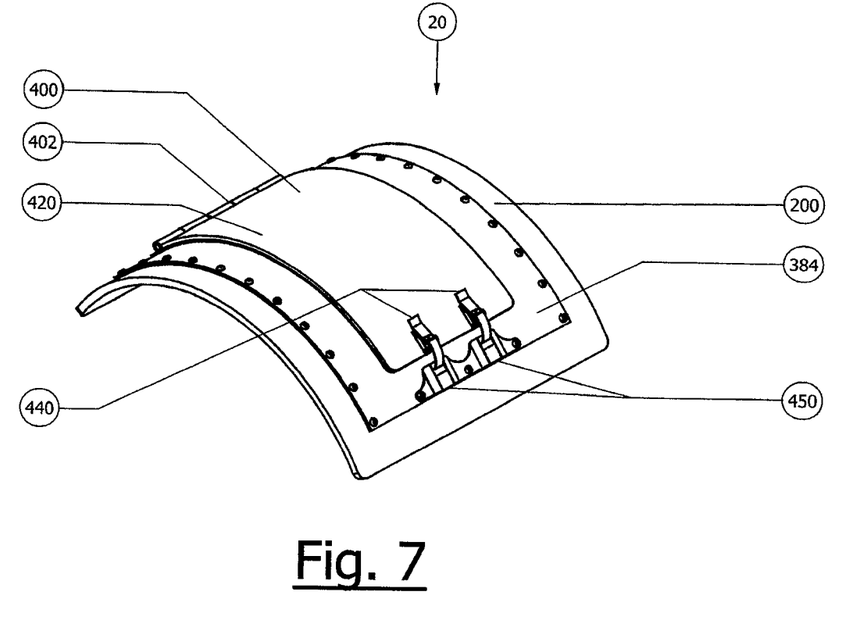
FIG. 7 is a perspective view of a pivoting curved door provided by the curved viewing window assembly in accordance with the concepts of the present invention.

Continuing, to allow selective access to the front grille 300 of the IR lens assembly 260, a door 400 is attached by a hinge 402, such as a piano hinge, to the outer surface 388 of the front grille 384, as shown in FIGS. 1 and 3. The hinge 470 may be attached to the door 400 and the support plate 200 using any suitable means of fixation, such as rivets, screws, and adhesive for example. The door 400 is formed as a section of any suitable material that is opaque to infrared (IR) light, ultraviolet light, and visible light, so that it is not capable of allowing such light from passing therethrough. In addition, the door 400 has an inner surface 410 and outer surface 420 that is bounded by an edge 422, such that the inner surface 410 has a radius of curvature that is substantially the same as the radius of curvature of the outer surface 388 of the front grille 384. This allows the door 400 to sit congruently against the outer surface 388 of the front grille 384 when the door 400 is moved from an opened position in which IR, UV, or visible light is free to pass out of the viewing lens assembly 260, to a closed position, in which the door 400 is positioned against the viewing apertures 350 of the front grille 300, thereby preventing the passage of IR radiation out of the IR lens assembly 200. To retain the door 400 in a closed position, a latch assembly is provided, as shown clearly in FIG. 7, whereby the door 400 includes one or more latches 440 that are configured to engage a latch striker 450 attached on the front grille 384. Thus, when the door 400 is moved to a closed position, the striker 450 engages the latches 440, causing the door 400 to be locked into place. Alternatively, to release the door 400 from its closed position, latches are released, allowing the door 400 to be moved to its opened position.

It should also be appreciated that the door 400 may also include a cover 500, as shown in FIG. 3, which is attached to the inner surface 410 of the door. The cover 500 may comprise any suitable material, that facilities the sealing of the door 400 to the front grille 384, so as to make the interface there between water and/or airtight.

In an alternative embodiment, the viewing window assembly 20 may be configured so that it excludes the rear grille 300 and utilizes only the front grille 384. In such embodiment, the lens section 380 is then attached to inner surface 386 of the front grille 384 using any suitable means of fixation, such as rivets or adhesive, so that it overlays the viewing apertures 390. Furthermore, the offset section 391 of the front grille 384 is then sealed to the gasket 450 that is disposed on the support plate 200 that is attached to the bus duct 10.

It should also be appreciated that one or both of the front and rear curved grilles 384,300 may be configured to have a curvature that allows them to be positioned congruently with each other, as well as with the curved lens section 380. Alternatively, the front and rear curved grilles 384,300 may be configured to have a curvature that allows them to be positioned congruently with the curved support plate 200, as well. Furthermore, it is also contemplated that the door 400 may have a curvature that allows it to be positioned congruently to any one or more of the curved front grille 384, the curved rear grille 300, the curved lens section 380, and the curved support plate 200.

Therefore, one advantage of the present invention is that a curved viewing window assembly for a curved bus duct or curved housing provides a curved lens assembly with discrete viewing apertures that provides a large field of view (FOV) for the imaging of IR, UV, and visible light emanating from electrical equipment and components carried in the bus duct or other housing. Still another advantage of the present invention is that a curved viewing window assembly for a curved bus duct or curved housing includes a curved door that can be selectively opened and closed as desired, to prevent the unwanted transmission of infrared (IR) light, ultraviolet (UV) light, or visible light through the viewing window assembly when electrical equipment in the bus duct is not being actively monitored. Furthermore, there is a need for a curved infrared (IR) window assembly for a curved bus duct or housing that prevents environmental leakage about the viewing window assembly, and that prevents the intrusion of debris and particles around the viewing window assembly and into the attached bus duct or housing.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An electrical component assembly comprising:
a body having an at least partially curved portion with an aperture disposed therethrough, said body defining a cavity that is configured to carry said one of more electrical components therein; and
an infrared viewing window assembly adapted to be disposed upon the at least partially curved portion at the aperture on the body, the infrared viewing window assembly comprising:
a lens assembly including:
a curved lens transparent to at least infrared (IR) light; and
two curved grilles for supporting said curved lens, a first curved grille having a first plurality of viewing apertures, and a second curved grille having a second plurality of viewing apertures, wherein said first plurality of viewing apertures of said first grille are spaced further apart than said second plurality of viewing apertures of said second grille are spaced apart, said curved lens and said first and second plurality of viewing apertures of two curved grilles in optical alignment with said aperture of said body for viewing of said one or more electrical components contained within the cavity of said body, and wherein: $S1=(S2/R2) \times R1$, where S1 is the arc length between the viewing apertures of the first grille; S2 is the arc length between viewing apertures of the second grille; R1 is the radius of curvature of the first grille; and R2 is the radius of curvature of the second grille.

2. The electrical component assembly of claim 1, wherein the infrared viewing window assembly further comprises a gasket disposed about said aperture of said body; wherein the edges of said first grille extend beyond each edge of said second grille and said lens, such that said first grille seals against said gasket.

3. The electrical component assembly of claim 1, wherein the infrared viewing window assembly further comprises a curved door pivotably attached to said lens assembly to selectively cover said lens.

4. The electrical component assembly of claim 3, wherein said curved door, said curved lens and said first curved grille are congruent with each other.

5. The electrical component assembly of claim 1, wherein said lens assembly is spaced from said body by a curved support plate attached to said at least partially curved portion of said body, said support plate having an opening in optical alignment with said aperture of said body and said lens assembly.

6. The electrical component assembly of claim 5, wherein said curved support plate, said curved lens and said curved portion of said body are congruent with each other.

7. The electrical component assembly of claim 1, wherein said body is a bus duct that carries the one or more electrical components therein.

8. The electrical component assembly of claim 1, wherein said curved lens is congruent with said two curved grilles.

9. The electrical component assembly of claim 1, wherein said first and second grilles are attached to each other.

10. An infrared viewing window assembly for an electrical component assembly having a curved surface containing an aperture disposed therethrough, the infrared viewing window assembly comprising:
a lens assembly adapted to be disposed upon said curved surface, said lens assembly including a curved lens transparent to at least infrared (IR) light, and two curved grilles for supporting said curved lens, a first curved grille having a first plurality of viewing apertures, and a second curved grille having a second plurality of viewing apertures, wherein said first plurality of viewing apertures of said first grille are spaced further apart than said second plurality of viewing apertures of said second grille are spaced apart, said curved lens and said first and second plurality of viewing apertures of said two curved grilles in optical alignment with said aperture of the curved surface, and wherein: $S1=(S2/R2) \times R1$, where S1 is the arc length between the viewing apertures of the first grille; S2 is the arc length between viewing apertures of the second grille; R1 is the radius of curvature of the first grille; and R2 is the radius of curvature of the second grille.

11. The infrared viewing window assembly of claim 10, further comprising a gasket disposed about said aperture of the curved surface;
wherein the edges of said first grille extend beyond each edge of said second grille and said lens, such that said first grille seals against said gasket.

12. The infrared viewing window assembly of claim 10, further comprising a curved door pivotably attached to said lens assembly to selectively cover said lens.

13. The infrared viewing window assembly of claim 12, wherein said curved door, said curved lens and said first curved grille are congruent with each other.

14. The infrared viewing window assembly of claim 10, wherein said curved lens is congruent with said two curved grilles.

15. The infrared viewing window assembly of claim 10, wherein said first and second grilles are attached to each other.

16. An infrared viewing window assembly for a curved surface having an aperture disposed therethrough, the viewing window assembly comprising:
- a base plate for attaching the infrared viewing window assembly to the surface around the aperture disposed in the surface;
- a curved first grille having a first group of a plurality of viewing apertures disposed therethrough;
- a curved second grille having a second group of a plurality of viewing apertures disposed therethrough, wherein said plurality of viewing apertures of said first group of viewing apertures are spaced further apart than said plurality of viewing apertures of said second group are spaced apart;
- a lens section disposed between said first and second grilles, said lens section in optical alignment with each said first and second groups of said plurality of viewing apertures;
- wherein said second grille is attached to said first grille, said first grille adapted to be attached to the base plate, such that said first and second viewing apertures are substantially aligned with the aperture disposed through the curved surface;
- wherein a radius of curvature of the lens corresponds to radiuses of curvature of the first and second grilles, and wherein: $s1=(s2/R2) \times R1$, where S1 is the arc length between the viewing apertures of the first grille; S2 is the arc length between viewing apertures of the second grille; R1 is the radius of curvature of the first grille; and R2 is the radius of curvature of the second grille.

17. An infrared viewing window assembly for an electrical component assembly containing electrical components and having a curved surface containing an aperture disposed therethrough, the infrared viewing window assembly comprising:
- a lens assembly adapted to be disposed upon said curved surface, said lens assembly including a curved lens transparent to at least infrared (IR) light, and two curved grilles for supporting said curved lens, a first curved grille having a first plurality of viewing apertures, and a second curved grille having a second plurality of viewing apertures, wherein said first plurality of viewing apertures of said first grille are spaced further apart than said second plurality of viewing apertures of said second grille are spaced apart, said curved lens and said first and second plurality of viewing apertures of said two curved grilles in optical alignment with said aperture of the curved surface, and wherein the viewing apertures of the two curved grilles are provided in an aligned arrangement, configured to provide passage of the at least IR light through the viewing apertures of the lens assembly with a maximized field of view (FOV) for imaging the electrical components.

* * * * *